Sept. 9, 1941.   F. O. ANDEREGG   2,255,041
DEHUMIDIFYING MATERIAL
Filed Aug. 3, 1937
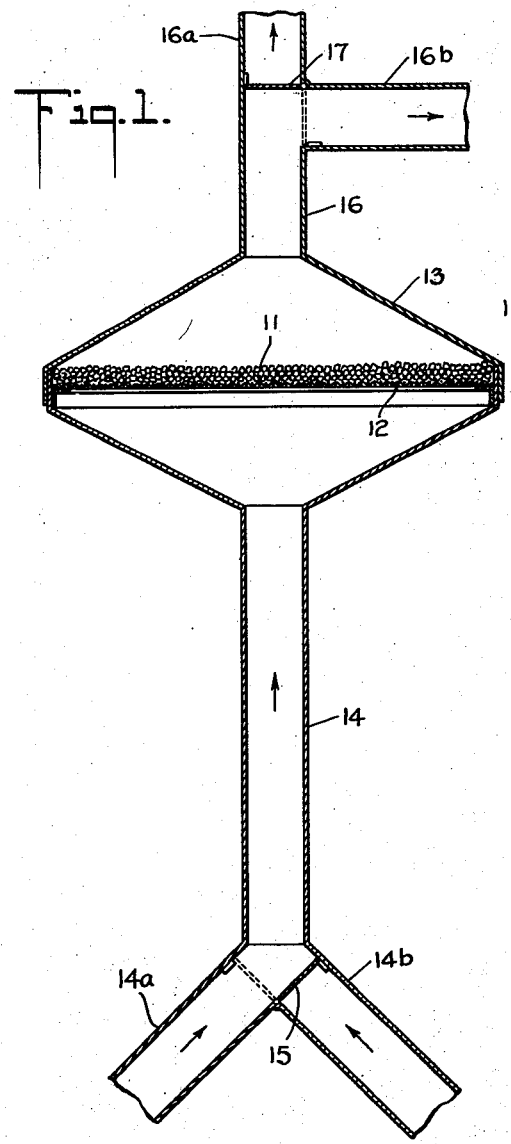
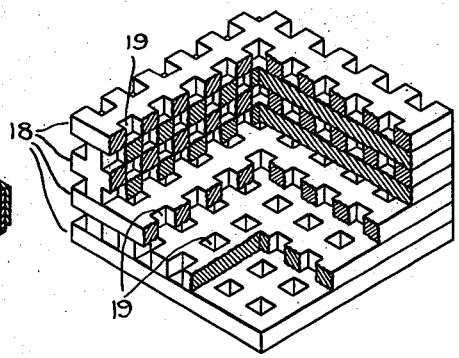
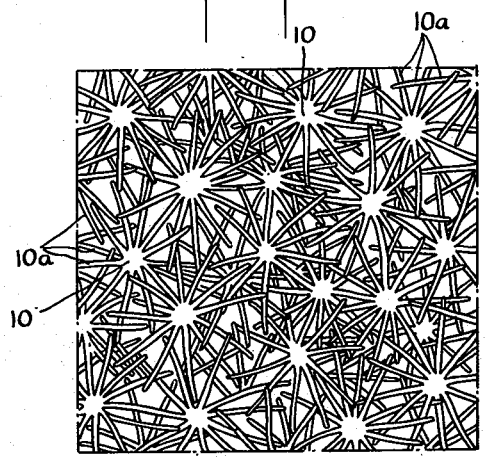
INVENTOR
Frederick O. Anderegg
BY
Henry J. Lucke
HIS ATTORNEY Patented Sept. 9, 1941

2,255,041

UNITED STATES PATENT OFFICE 2,255,041

DEHUMIDIFYING MATERIAL

Frederick O. Anderegg, Newark, Ohio

Application August 3, 1937, Serial No. 157,136

12 Claims. (Cl. 252—194)

This invention relates to dehumidifying materials, and particularly to dehumidifying materials embodying a porous skeleton structure serving as a carrier for an hygroscopic agent.

The dehumidifying material of the present invention is intended primarily for use in removing moisture from air or other gases passing through the pore system thereof, and is especially applicable to the dehumidification of air in air conditioning systems.

Outstanding structural features of the skeleton carrier material of the invention includes the provision of a system of interconnecting pores throughout the body thereof adequate for the absorption and retention of considerable quantities of moisture, and the provision for structural strength sufficient to enable the skeleton network to withstand the stress and strains incident to ordinary handling and to the application and continued reapplication of a regenerative process at such times as the pores become filled with moisture.

The hygroscopic agent employed is one which will chemically combine with the material of the skeleton carrier without nullifying or seriously decreasing the deliquescent properties of the hygroscopic agent and without adversely affecting the structural strength of the skeleton network.

By reason of the aforestated chemical combination of the hygroscopic agent with the material of the skeleton carrier, as differentiated from mere physical adsorption, migration of the hygroscopic agent into and through the pore passages of its carrier is precluded, with the consequent elimination of any possibility of premature stoppage of pore passages.

The carrier material of the present invention may be calcium hydrosilicate or calcium hydroaluminate, or a combination of the two, physically forming a 3-dimensional skeleton network of exceptionally high porosity, the pores interconnecting throughout in a comprehensive pore system.

The hygroscopic agent employed is calcium chloride, incorporated with the calcium hydrosilicate and/or the calcium hydroaluminate skeleton network either during a stage in the formation of the latter, or by surface impregnation after complete formation. Either method effects a chemical reaction between the calcium hydrosilicate and/or calcium hydroaluminate and the calcium chloride, accomplishing anchoring of the calcium chloride to the skeleton network. The chemical reaction results in the formation of chlorohydrosilicate and/or chlorohydroaluminate in the walls of the pore passages.

Further features of the invention will be more fully understood from the following detailed description and the accompanying drawing in which:

Fig. 1 represents a vertical section through apparatus for utilizing and regenerating the dehumidifying material.

Fig. 2 represents, in perspective, a dehumidifying structure formed from the dehumidifying material. Parts of the structure are broken away for the sake of clarity of illustration.

Fig. 3 is a diagrammatic representation of the 3-dimensional skeleton network of the dehumidifying material enlarged from microscopic proportions.

With reference to the drawing, the general physical structure of the skeleton network of the carrier material is illustrated diagrammatically, and greatly magnified, in Fig. 3. The network as illustrated, and as required for successful results, comprises a fibrous structure formed by a collection of star-like crystals, each of the crystals having a plurality of long tenuous tentacles designated 10a radiating from a central body designated 10. The star-like crystals are haphazardly arranged, the tentacles 10a interweaving to form a loosely organized 3-dimensional skeleton network of a highly porous nature. As a result of this tentacle or fibrous structure the material as a whole has low moduli of elasticity and hence considerable resilience, being somewhat analogous to a wicker structure.

The tentacles or fibers, functioning as struts, contribute in an unusual degree to the strength of the structure.

It will be noted that the pore system of the skeleton network formed by the star-like crystals is highly integrated throughout the material and comprises comparatively open pores freely interconnecting, as distinguished from the air cell or bubble type of porous material.

Embodiments of the aforedescribed skeleton network may be produced according to the method disclosed in U. S. Patent No. 1,932,971, issued October 31, 1933, to Huttemann et al., for Method of making light weight blocks, or according to the method disclosed in application for U. S. Patent, Serial No. 722,884 filed April 28, 1934, U. S. Patent No. 2,105,324, issued Jan. 11, 1938, to Huttemann, et al., for Method of producing light weight material. The material prepared pursuant to the disclosure of such patent or patents may be calcium hydrosilicate and/or calcium hydroaluminate, depending upon the composition of the original constituents and embodies all the characteristics desirable and requisite for the carrier material of the present invention.

The hygroscopic agent employed is calcium chloride. It may be incorporated in the stated carrier material either during a stage of formation of the latter, or thereafter by surface impregnation.

According to the first stated method, i. e. of incorporating the calcium chloride in the carrier material during a formative stage of the latter, and pursuant to the disclosures of the stated U. S. Patent #1,932,971, and U. S. Patent No. 2,105,324, the calcium chloride is admixed with the constituent raw materials during the primary mixing stage.

Preferred proportions of constituent materials cover the range of from 15 to 55 parts of finely pulverized calcareous material mixed with from 45 to 85 parts of finely pulverized siliceous or alumina materials, and from 100 to 500 parts water; calcium chloride being admixed over the range of from 35 to 65 parts, but usually a straight 50 parts, as $CaCl_2$ per one hundred parts by weight of other solids.

The relative proportions of the constituent materials may be varied considerably, depending upon the exact physical characteristics desired in the resulting product.

The entire mixture may be heated to form a thick soup exhibiting the properties of thixotropism, and thereafter molded as desired. The subsequent and final step of induration results in the formation of the desired hydrosilicate or hydroaluminate skeleton network, having walls of chlorohydrosilicate or chlorohydroaluminate, hygroscopic in nature.

Pursuant to one embodiment of the general method disclosed in U. S. Patent No. 2,105,324, such general method being differentiated in the main from the method disclosed in U. S. Patent #1,932,971 by the preferred addition of a light weight aggregate as a constituent raw material, only one-half to two-thirds of the total amount of calcareous material is initially mixed with the siliceous or alumina materials, the remainder being added as the calcium hydrocompounds are formed, to supply new reagent.

According to the second method of incorporating the calcium chloride with the carrier material, i. e. by surface impregnation after complete formation of the skeleton network, a solution comprising approximately 50% calcium chloride is prepared. The skeleton network is allowed to soak up a weight of the solution equal approximately to its own weight. As the solvent water is dried out with the aid of heat, conditions are favorable for interaction of calcium chloride with, and at the surface of, the hydrosilicate and/or hydroaluminate net work, to form chlorohydrosilicate and/or chlorohydroaluminate.

The resulting dehumidifying material has a total pore space greater than 50% and as high as 95%. Optimum efficiency is obtained with a pore space of 80%, porosity being controlled by properly proportioning the constituent raw materials. The average diameter of each pore is of the order of from one to two microns.

As to composition and porosity, I cite as illustrations, when 32 parts CaO are mixed with 68 parts $SiO_2$ and 500 parts of water, subjected to a preliminary cooking stage and a final hardening stage, and dried out, the product contains about 12% water of hydration. The remaining water on drying out will leave a pore space of about 94%, and the unit weight will be about 10 lbs. per cubic foot. When only 100 parts of water are added as above, the final porosity is about 66% and the unit weight approximately 50 lbs. per cubic foot. The preferred composition results from the employment of about 250 parts of water, and contains a porosity of about 80%, having a good combination of structural strength and porosity.

The dehumidifying material may be broken up to a granular state for use. A convenient apparatus for accomplishing alternate dehumidification of passing currents of air and regeneration of the dehumidifying material is illustrated in Fig. 1. A quantity of granular dehumidifying material 11 is supported on a screen 12 forming a porous bed within the confines of a closed chamber 13. Such porous bed completely traverses the passage through the stated closed chamber 12. A flue for the alternate introduction of moisture laden air or other gas to be conditioned and of heated air for the purposes of regeneration is indicated at 14, leading into the closed chamber 13 below the supported bed of dehumidifying material 11. A flue 14a and a flue 14b may branch from the main flue 14, a flap-valve 15 being disposed at the branch juncture for establishing exclusive flow communication between main flue 14 and either one or the other of the branches. Moisture laden air or other gas to be dehumidified may be supplied through one of the two branches 14a and 14b, heated air for regenerating the dehumidifying material 11 being supplied through the other. A flue leads from the upper portion of the chamber 13, and branches to form flues 16a and 16b, one functioning to convey the dehumidified air from chamber 13 for subsequent use, and the other acting as a discharge stack for the heated air after it has accomplished its regenerative function of extracting moisture from the dehumidifying material 11. A flap-valve 17, interposed at the juncture of the branches, provides for directed outflow.

When the flap-valves 15 and 17 are appropriately set moisture laden air or other gas to be dehumidified passes through the bed of dehumidifying material 11 in intimate association therewith, diffusing through the extensive pore system thereof and giving up its moisture. Regeneration of the bed of the dehumidifying material may be accomplished at intervals, as required, when the pore passages have become saturated with moisture, by suitably adjusting the flap-valves 15 and 17 to afford passage of heated air upwardly through the bed of dehumidifying material.

Such continued use of the dehumidifying material and re-use after regeneration, is made practical by the structural characteristics imparting strength to the skeleton network.

A distinct advantage afforded by the invention resides in the possibility of imparting any desired configuration to the material in providing a dehumidifying structure, as for instance, that illustrated in Fig. 2, which comprises a plurality of plates 18 of the dehumidifying material perforated in checker-work fashion, the plates being superimposed to provide a plurality of passages 19 alternately open and closed affording dehumidifying flow of moisture laden air therethrough.

By reason of the comprehensiveness of the pore system of the dehumidifying material representing the invention, and the open, interconnecting nature of the pores, full utilization of the hygroscopic character of the pore walls is possible. Moisture attracted by the hygroscopic agent penetrates deeply into the body of the structural network leaving superficial pores free for continued moisture collection. Because the hygroscopic agent is "anchored" in the pore walls, migration thereof and resulting untimely stoppage of the superficial, or in fact, any, of the pores is precluded.

Whereas this invention has been illustrated and described with respect to preferred embodiments thereof, it is to be understood that changes may be made therein without departing from the spirit of the invention as generalized herein and in the claims that follow.

I claim:

1. A dehumidifying material comprising a skeleton structural network formed of calcium hydrosilicate and calcium hydroaluminate having pore space in the range of from 65% to 95% of the volume of the network and individual pores of the order of from 1 to 2 microns in diameter freely intercommunicating throughout the network, the surfaces of said pores comprising chlorohydrosilicate and chlorohydroaluminate.

2. A dehumidifying material comprising a skeleton structural network formed of calcium hydrosilicate having pore space in the range of from 65% to 95% of the volume of the network and individual pores of the order of from 1 to 2 microns in diameter freely intercommunicating throughout the network, the surfaces of said pores comprising chlorohydrosilicate.

3. A dehumidifying material comprising a skeleton structural network formed of calcium hydroaluminate having pore space in the range of from 65% to 95% of the volume of the network and individual pores of the order of from 1 to 2 microns in diameter freely intercommunicating throughout the network, the surfaces of said pores comprising chlorohydroaluminate.

4. A dehumidifying material as recited in claim 1 molded to predetermined configuration.

5. A dehumidifying material as recited in claim 2 molded to predetermined configuration.

6. A dehumidifying material as recited in claim 3 molded to predetermined configuration.

7. The method of producing a dehumidifying material, which comprises mixing finely pulverized calcareous material with finely pulverized siliceous and alumina materials and with an excess of water, and admixing calcium chloride therewith; heating the mixture to form a thick soup exhibiting the property of thixotropism; and indurating the mixture to form a 3-dimensional skeleton network provided with a comprehensive interconnecting pore system; the amount of calcium chloride being sufficient to render the material of said skeleton network hygroscopic to an extent appreciably enhancing its ability for absorbing moisture.

8. The method of producing a dehumidifying material, which comprises mixing finely pulverized calcareous material with finely pulverized siliceous material and with an excess of water, and admixing calcium chloride therewith; heating the mixture to form a thick soup exhibiting the property of thixotropism; and indurating the mixture to form a 3-dimensional skeleton network provided with a comprehensive interconnecting pore system; the amount of calcium chloride being sufficient to render the material of said skeleton network hygroscopic to an extent appreciably enhancing its ability for absorbing moisture.

9. The method of producing a dehumidifying material, which comprises mixing finely pulverized calcareous material with finely pulverized alumina material and with an excess of water, and admixing calcium chloride therewith; heating the mixture to form a thick soup exhibiting the property of thixotropism; and indurating the mixture to form a 3-dimensional skeleton network provided with a comprehensive interconnecting pore system; the amount of calcium chloride being sufficient to render the material of said skeleton network hygroscopic to an extent appreciably enhancing its ability for absorbing moisture.

10. The method of producing a dehumidifying material, which comprises mixing finely pulverized calcareous material with finely pulverized siliceous and alumina materials and with an excess of water, and admixing calcium chloride therewith as $CaCl_2$ in proportion of the order of 35 to 65 parts by weight of $CaCl_2$ per 100 parts of other solids; heating the mixture to form a thick soup exhibiting the property of thixotropism; and indurating the mixture to form a 3-dimensional skeleton network provided with a comprehensive interconnecting pore system; the amount of calcium chloride being sufficient to render the material of said skeleton network hygroscopic to an extent appreciably enhancing its ability for absorbing moisture.

11. The method of producing a dehumidifying material, which comprises mixing finely pulverized calcareous material with finely pulverized siliceous material and with an excess of water, and admixing calcium chloride therewith as $CaCl_2$ in proportion of the order of 35 to 65 parts by weight of $CaCl_2$ per 100 parts of other solids; heating the mixture to form a thick soup exhibiting the property of thixotropism; and indurating the mixture to form a 3-dimensional skeleton network provided with a comprehensive interconnecting pore system; the amount of calcium chloride being sufficient to render the material of said skeleton network hygroscopic to an extent appreciably enhancing its ability for absorbing moisture.

12. The method of producing a dehumidifying material, which comprises mixing finely pulverized calcareous material with finely pulverized alumina material and with an excess of water, and admixing calcium chloride therewith as $CaCl_2$ in proportion of the order of 35 to 65 parts by weight of $CaCl_2$ per 100 parts of other solids; heating the mixture to form a thick soup exhibiting the property of thixotropism; and indurating the mixture to form a 3-dimensional skeleton network provided with a comprehensive interconnecting pore system; the amount of calcium chloride being sufficient to render the material of said skeleton network hygroscopic to an extent appreciably enhancing its ability for absorbing moisture.

F. O. ANDEREGG.